United States Patent [19]

Van Alem et al.

[11] 4,239,942

[45] Dec. 16, 1980

[54] DUAL RADIAL POSITION SERVO TO COMPENSATE FOR RADIAL TRACKING FAILURE IN AN OPTICAL DISC PLAYER

[75] Inventors: Antonius A. M. Van Alem; Cornelis H. J. Vos, both of Eindhoven, Netherlands

[73] Assignee: U.S. Philips Corporation, New York, N.Y.

[21] Appl. No.: 973,273

[22] Filed: Dec. 26, 1978

[30] Foreign Application Priority Data

Aug. 22, 1978 [NL] Netherlands ............... 7808638

[51] Int. Cl.$^3$ .............................................. G11B 21/10
[52] U.S. Cl. ............................... 179/100.1 G; 360/38; 360/77
[58] Field of Search ................ 358/128; 179/100.3 D, 179/100.3 M, 100.3 V, 100.4 D, 100.1 G; 360/38, 77, 72.1, 70

[56] References Cited

U.S. PATENT DOCUMENTS

| | | | |
|---|---|---|---|
| Re. 29,963 | 4/1979 | Janssen | 358/128 |
| 3,381,086 | 4/1968 | De Moss et al. | 179/100.3 V |
| 4,142,209 | 2/1979 | Hedlund et al. | 358/128 |
| 4,151,566 | 4/1979 | Ohrman | 360/72.1 |

Primary Examiner—Bernard Konick
Assistant Examiner—Donald McElheny, Jr.
Attorney, Agent, or Firm—Thomas A. Briody; William J. Streeter; Simon L. Cohen

[57] ABSTRACT

An apparatus for reading a disk-shaped record carrier, the radial scanning position being controlled with the aid of a first servo control loop, which controls a positioning member for the read element depending on a control signal which is read from the record carrier. If this control is disturbed a second servo control loop is rendered operative. This second servo control loop comprises a position indicator for supplying a position signal which is representative of the radial position of the positioning member, a memory circuit for storing the value of this position signal at the instant of failure of the first servo control loop, and a differential amplifier for applying a control signal to the positioning member, which signal corresponds to the difference between the instantaneous and the stored value of said position signal. Furthermore, there is provided a control circuit for changing-over between the first and the second servo control loop and vice versa depending on a built-in criterion.

6 Claims, 8 Drawing Figures

DUAL RADIAL POSITION SERVO TO COMPENSATE FOR RADIAL TRACKING FAILURE IN AN OPTICAL DISC PLAYER

BACKGROUND OF THE INVENTION

The invention relates to apparatus for reading a disk-shaped record carrier, on which information has been recorded in accordance with a pattern of substantially concentric tracks. The apparatus comprises a read element which cooperates with the record carrier without mechanical radial guidance, a positioning member carrying said read element for moving said read element in a radial direction, and a first servo control loop for controlling the position of the positioning member. The first servo control loop is provided with a measuring system for measuring the radial positional deviation of the scanning point on the record carrier relative to a desired track which point is determined by the read element, and a drive means for the positioning member, which means a coupled to said measuring system.

Disk-shaped record carriers on which video and/or audio information or other data are recorded have many different formats. A fundamental distinction can then be made between record carriers for which the read element is mechanically guided in a radial direction and record carriers for which this is not the case. In the first-mentioned case the information is generally stored in a track which takes the form of a groove in the record carrier surface and the read element comprises a stylus which during scanning of the record carrier is positioned in the groove and is consequently guided in the radial direction by the groove walls.

However, in recent years much interest is taken in record carriers having a smooth surface, i.e. at least having no geometrical groove, because especially at higher speeds, the wear of the record carrier surface occurring in the case of mechanical guidance is considerable. The most striking example of such a record carrier is a record carrier on which the information is recorded in optically coded form and which is scanned with the aid of a radiation beam. Another example is a disk-shaped magnetic record carrier which is read with the aid of a magnetic pick-up element. Finally, disk-shaped record carriers may be mentioned in which the information is recorded in the form of geometry variations of a track, which geometry variations can be read by depositing a conductive layer in the track and capacitively scanning this track. If after the geometry variations have been formed and the conductive layer has been applied the recesses in the disk surface are filled, a smooth surface is obtained, so that this type of the capacitive scanner is not mechanically guided by the track.

In all these cases it is necessary to ensure that the read element always keeps following the information track or tracks by mean means of a control system, i.e. a control system for controlling the position of the read element transverse to the track direction. This first of all demands a measuring system which is capable of supplying a signal which is a measure of the position of the scanning point relative to the information track. Such systems, in particular those for optical read apparatus, are of many different types. As the manner in which the position of the scanning point relative to the desired track is detected is not essential for the present invention reference is made to the possibilities described in U.S. Pat. Nos. 3,876,842 3,833,768, and Netherlands Pat. Appl. Ser. No. 7314267 and Ser. No. 7512084.

With the aid of the measuring signal thus obtained a corrective radial movement of the read element may be realized. For this purpose this read element may be arranged on a positioning member which is capable of moving said read element. An optical read apparatus of the type mentioned in the preamble, comprising such a positioning member is for example known from Netherlands Patent Application Ser. No. 7509799. In this apparatus the optical read element is mounted on a first end of a carrying arm whose other end is rotatably journalled, while the angular position of this carrying arm can be changed with the aid of drive means in the form of an electromagnetic torque generator which influences said carrying arm. The carrying arm with the read element on its first end is so positioned relative to the record carrier and so dimensioned that a rotation of said carrying arm substantially results in a displacement of the read element in the radial direction of the record carrier. As the measuring detector for measuring the position of the scanning point relative to the information track and the carrying-arm drive means controlled by the measuring signal are included in a first control loop an accurate tracking of the scanning point can thus be obtained.

A requirement in order to ensure this accurate tracking regardless of any eccentricity of the position of the track on the record carrier relative to the axis of rotation is that both the gain and the frequency bandwidth of said first control loop should be sufficiently great. In order to achieve this it is desirable that both the carrying-arm drive means and the carrying arm itself cause a minimal damping in said servo control loop, because only in that case a high tracking speed and tracking accuracy can be obtained.

In practice this small damping in the first servo control loop may give rise to serious faults of the system. If the record carrier is locally damaged the control signal for the drive means may assume a completely arbitrary value when this damaged part is scanned. Since the damping is small this may give rise to the positioning member being moved over a comparatively large distance in an uncontrolled manner, and not being stopped until a completely deviating radial position is reached. The same may happen if the apparatus is subject to a shock owing to an external cause. As a result of such a cause it may therefore happen that comparatively large portions of the recorded information are skipped during reading.

It is an object of the invention to mitigate these drawbacks and to this end the invention is characterized in that the apparatus is provided with a control circuit for generating a first control signal as soon as the radial control provided by the first servo control loop fails, and switching means, which are coupled to said control circuit, for rendering the first servo control loop inoperative and at least substantially simultaneously rendering a second servo control loop operative upon the occurrence of the first control signal, which second servo control loop is provided with a position indicator for supplying a position signal which is representative of the radial position of the read element, a memory circuit, which is coupled to said position indicator and to the signal detector, for the storage and preservation of the value of the position signal at the instant of the appearance of the first control signal, a differential amplifier for determining the difference between said stored value and the instantaneous value of the position signal, and application means for the application of the difference signal to the drive means of the positioning member.

The step in accordance with the invention ensures that if owing to whatever causes the first servo control loop is no longer capable of making the scanning spot coincide with the information track, i.e. in the case of tracking failure, said first servo control loop is rendered inoperative and the second servo control loop is activated. Said second servo control loop then ensures that the positioning member, and thus the read element, assumes a radial position which corresponds to the radial position at the instant of tracking failure. This effectively prevents the read element after such a tracking failure from assuming an arbitrary unpredictable position, since in this case a substantial portion of the information stored would not be read.

When the read element has resumed the desired radial position it may be attempted to render the first servo loop operative and to read the information again. To this end the apparatus in accordance with the invention is characterized in that the control circuit is adapted to generate a second control signal, after the generation of the first control signal, as soon as a criterion imposed by said control circuit is met, and that the switching means are adapted to render the first servo control loop operative again and the second servo control loop inoperative upon the appearance of the second control signal.

In this respect the simplest criterion to be applied may be a fixed time delay between the first and the second control signal. Depending on the properties of the record carrier and the desired perfection of the system more intricate criteria are possible.

For the detection of the occurrence of a tracking failure a preferred embodiment of the apparatus in accordance with the invention is characterized by the presence of an amplitude detector, which is coupled to the read element for detecting the amplitude of the information signal being read from the record carrier.

BRIEF DESCRIPTION OF THE DRAWINGS

The invention will now be described in more detail with reference to the drawing, in which FIG. 1 schematically represents an embodiment of the apparatus in accordance with the invention.

DETAILED DESCRIPTION OF THE PREFERRED EMBODIMENTS

Figure 1:
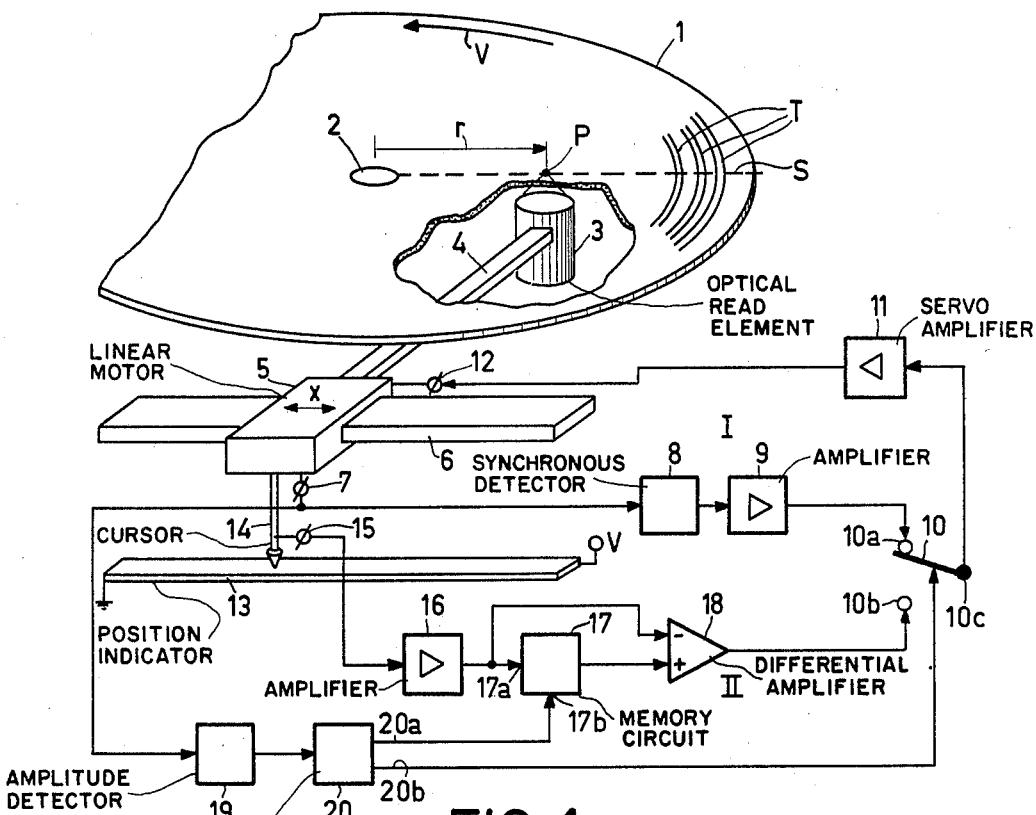

FIG. 1 schematically represents a first embodiment of the apparatus in accordance with the invention. By way of illustration it is assumed that a disk-shaped record carrier is used, on which the information is stored in optically coded form in a spiral track, while the read apparatus consequently employs an optical scanning system which with the aid of a radiation source and a focussing system projects a scanning spot onto the track. The information contents of the radiation beam which has passed through the record carrier or which has been reflected is thereby detected with the aid of a light transducer, for example a photo diode. Examples of such record carriers and optical scanning systems for video and/or audio systems are adequately known from the literature, so that in the scope of the present invention for example the signal coding, the method of optical modulation in the information track and the method of optical scanning need not be described in more detail.

In the apparatus in accordance with FIG. 1 a disk-shaped record carrier 1 is rotated in a direction V. For this purpose said record carrier is placed with its central opening 2 over a spindle in the usual manner, which spindle is driven by a motor. For the clarity of the Figure the two last-mentioned elements (spindle and motor) are not shown. The record carrier 1 is read with the aid of an optical read element 3. This read element projects a scanning spot P onto the lower surface of the record carrier 1, in which surface the spiral information track is disposed, some parts T of this track being shown by way of illustration. Furthermore, it is assumed that the record carrier is reflecting, so that the radiation beam which is incident on the record carrier is reflected and can be detected by a photodiode which is incorporated in the optical read element 3. Thus, in the present example it is assumed that the read element 3 contains both the radiation source and the photodiode. Moreover, said read element 3 obviously comprises a focussing system which in known manner ensures that the scanning spot P remains focussed on the lower surface of the record carrier 1.

The optical read element 3 is connected to a positioning member 5 via a carrying arm 4 (the record carrier has been partly cut away so as to clearly show this connection). The positioning member 5 is mounted on a guide element 6 and can move in the direction X. As a result of this the scanning spot P produced by the read element 3 can move along the axis S, so that by means of said positioning member 5 the entire area of the record carrier 1 lies within the scanning range of the read element 3.

Moreover, the positioning member 5 is employed to ensure that the scanning spot P continuously cooperates with the information track. As a result of inter alia a deviation in the position of the hole 2 the radial position of an information track will vary, so that in order to obtain a continuous and correct information read-out the radial position of the scanning spot P should be varied accordingly.

In the read apparatus shown this is achieved by controlling the position of the positioning member 5 and thus the radial position of the read element 3. In order to realized these comparatively rapid changes of the radial position of the read element 3 a control loop with a high loop gain and a large frequency band-width will be required. A first requirement for this is that the positioning member 5 should be capable of moving along the slide 6 with little friction and that moreover said positioning member 5 is driven with a small damping. This may for example be achieved by the use of a linear motor, the positioning member 5 and the slide 6 together constituting this linear motor.

In order to obtain radial position control of the scanning spot P it is obvious that a control signal is required which represents the radial positional deviation of this scanning spot P relative to the information track. Measuring systems for determining the radial position of a scanning spot relative to an information track are known from the literature in a multitude of varieties. By way of example reference is made to U.S. Pat. No. RE 29,263, which describes a measuring system which employs two additional radiation spots which are situated on both sides of the scanning spot P in the radial direction. Although any arbitrary measuring system may be used it is assumed that the embodiment of FIG. 1 employs a measuring system as described in U.S. Patent application Ser. No. 442,396, filed Feb. 14, 1974. This measuring system is based on a disk-shaped record carrier whose information track exhibits a periodic radial undulation. If such an information track is scanned the amplitude of the information signal being read will exhibit a periodic variation of the same periodicity as the undulation of the track. Depending on whether or not the scanning spot P is positioned correctly relative to the information track, this amplitude variation will be symmetrical or asymmetrical. By synchronous detection of these amplitude variations both the magnitude and the direction of the radial positional deviation of the scanning spot P can then be determined.

It is assumed that in the apparatus of FIG. 1 the positioning member 5 comprises a signal terminal 7 which via the carrying arm 4 is connected to the photodiode in the read element 3. During reading of the record carrier 1 the information signal read is consequently available on this signal terminal 7, which information signal is applied to a decoding unit, not shown, for processing the information signal. The output terminal 7 is moreover connected to a synchronous detector 8, which detects the amplitude of the information signal read and from said signal derives a measuring signal which represents the radial positional deviation of the scanning spot P relative to the information track. Via an amplifier 9, a switch 10, which is normally in the position shown, and a servo amplifier 11 this measuring signal is applied to a control terminal 12 on the positioning member 5. This control terminal 12 is connected to the drive means of the positioning member 5, i.e. in the case of a linear motor to the winding included in said motor. As a result of this the positioning member 5 performs a movement depending on the measuring signal, so that the first servo control loop I shown ensures that the scanning spot P follows the information track.

As a result of various causes it may happen that the signal terminal 7 temporarily supplies no information signal. This may for example be the case if the read apparatus is suddenly subject to a mechanical shock, so that the scanning spot P leaves the information track, or if the record carrier is damaged at the location of the information track being scanned. In that case the synchronous detector 8 will instantaneously supply an arbitrary, sometimes comparatively large, measuring signal. This erroneous measuring signal may give rise to a comparatively large displacement of the positioning member 5, especially because the movement of said positioning member is only damped to a small extent. This means that after the occurrence of such a fault the radial scanning position of the scanning spot P on the record carrier may have been subject to a comparatively large unpredictable change, which obviously is a highly undesirable situation.

In order to avoid this undesired situation the apparatus in accordance with the invention is first of all provided with a position indicator 13. This position indicator 13 serves to provide a position signal which is a measure of the radial position of the scanning spot P on the record carrier 1, i.e. a measure of the scanning radius r on the record carrier. This position indicator 13 can be realized in many versions, which will be discussed later. In the example of FIG. 1 it has been assumed by way of illustration that the position indicator 13 comprises a strip of a resistive material whose ends are at two different voltages ( $\overline{V}$ and V). On the positioning member 5 a cursor 14 is mounted which makes contact with said strip of resistive material. It will be evident that on a terminal 15 which is connected to said cursor 14 a signal becomes available which is a measure of the position of the positioning member 5 and thus of the scanning spot P on the record carrier 1.

Via an amplifier 16 this measuring signal is applied to a memory circuit 17. This circuit 17 serves to store the value of this signal at the instant that the position control of the scanning spot via the first servo control loop I is disturbed. For this purpose said circuit 17 may take the form of a sample-and-hold circuit, the signal to be sampled being applied to the input 17a and a control pulse which defines the sampling instant being applied to an input 17b. This control pulse can be obtained with the aid of an amplitude detector 19 which is connected to the signal terminal 7. As soon as the radial control of the scanning spot P is disturbed this scanning spot P will loose contact with the information track and no information signal will appear on the output terminal 7. This instant is detected by the amplitude detector 19, which then supplies a pulse to the circuit 17, so that from that instant a measuring signal appears on the output of this circuit 17, which signal corresponds to the radial position of the positioning member 5 at the instant of the disturbance. This measuring signal is applied to the non-inverting input of a differential amplifier 18, whose inverting input is connected to the amplifier 16 and thus receives a measuring signal which is a measure of the instantaneous position of the positioning member 5. The output signal of the differential amplifier is applied to the input terminal 10b of the switch 10. This switch 10 is also actuated via the detector 19, in such a way that upon the appearance of the said disturbance the input terminal 10b is connected to the master terminal 10c, so that the output signal of the differential amplifier 18 is then applied to the servo amplifier 11 and functions as control signal for the drive means of the positioning member. Thus, after the appearance of a disturbance a servo control loop II will be operative which ensures that the positioning member 5 retains a position which substantially corresponds to the position of the positioning member at the instant of the disturbance.

In order to revert to the tracking control for which the first servo control loop I is operative switch 10 should be set to the position shown. For this purpose use is also made of the amplitude detector 19. Since the positioning member occupies a fixed position when the second servo control loop is operative and since the information tracks will perform a varying radial movement as a result of a substantially inevitable eccentricity of the hole 2, an information signal will alternately appear and disappear from an information signal terminal 7. At an instant that this signal terminal 7 again supplies an information signal and the scanning spot thus coincides with the information track it may obviously be attempted to make the first servo control loop I lock in and to follow the information track again. This means that at the instant that the detector 19 detects the presence of an information signal on the signal terminal 7 said detector 19 can reset the switch 10 to the position shown, so that the first servo control loop I is rendered operative again. If desired, another specific criterion may be imposed for rendering the first servo loop I operative again after the appearance of a disturbance. As an example, the servo control loop I may be rendered operative again only if the signal terminal 7, at least integrated over a specific time, supplies an information signal frequently enough and long enough. In order to obtain such a criterion the detector 19 may be connected to a circuit 20 which supplies a control pulse to the switch 10 for the change-over to the servo control loop I only if this built-in criterion is met. In order to prevent the sample-and-hold circuit 17 from receiving sampling pulses at undesired instants, this circuit 17 is also controlled by the circuit 20. This circuit 20 consequently supplies a set of control signals on its outputs 20a and 20b, each consisting of a binary output signal, a first value being assumed as soon as a disturbance occurs and the second value being restored as soon as a criterion imposed in respect of the occurrence of an information signal on the signal terminal 7 is met.

Figure 2:
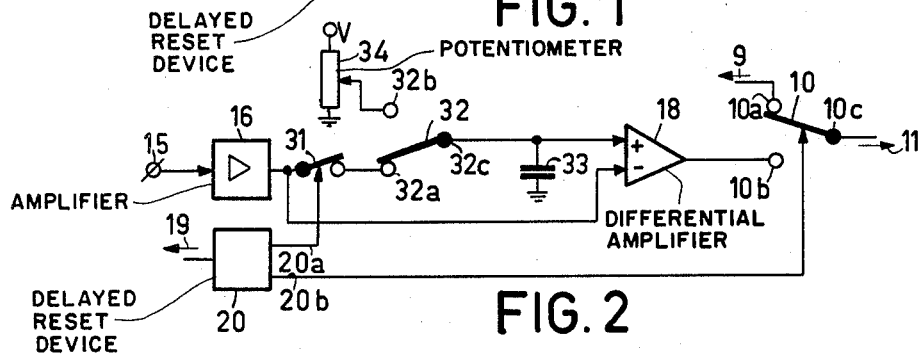
FIG. 2 shows an alternative version of a part of the second servo-control loop.

FIG. 2 shows an alternative for a part of the second servo control loop II, corresponding elements bearing the same reference numerals as in FIG. 1. The position signal from the position indicator 13, which is available on terminal 15, is applied to a capacitor 33 via the amplifier 16 and the switches 31 and 32, which are normally in the positions shown. Thus the voltage across said capacitor 33 normally follows the value of the position signal. At the instant that a disturbance occurs and the switch 10 is switched over with the aid of the detector 19 and circuit 20 so as to render the second servo control loop operative, the switch 31 which is actuated by the circuit 20 is also opened. This means that from that instant no more position signals are applied to the capacitor 33 and the voltage across this capacitor retains the value assumed at the instant of the disturbance. The voltage across the capacitor 33 is compared with the instantaneous value of the position signal on the output of the amplifier 16 with the aid of the differential amplifier 18, so that on the input terminal 10b of the switch 10 the desired control signal is obtained which via the switch 10, which is then in the position not shown, and the servo amplifier 11 is applied to the drive means of the positioning member 5.

The switch 32 can be set to the position in which the input terminal 32b is connected to the master terminal 32c. The wiper voltage of a potentiometer 34 across which a voltage V appears is applied to this input terminal 32b. In this position of the switch 32 the voltage across the capacitor 33 can be changed by moving the wiper of the potentiometer 34. If simultaneously with the switch 32 the switch 10 is also set to the position not shown, the second control loop is operative and the positioning member 5 occupies a position which is dictated by the wiper position of the potentiometer 34. In this way it is possible to move the scanning spot P rapidly to a desired radial scanning position.

As previously stated it is attempted to move the positioning member 5 with minimal friction so as to optimize the tracking of the scanning spot P. This also means that the position indicator 13 should exhibit minimal friction, because this friction introduces a friction term in the movement of the positioning member 5 via the wiper 14 which is connected to the positioning member 5. In this respect the schematically shown version of the position indicator is definitely not the optimum solution. The mechanical contact of the wiper 14 with the resistive material will always give rise to a certain friction term. Moreover, the resistive material will be subject to wear owing to the movements of the wiper 14.

Figure 3:
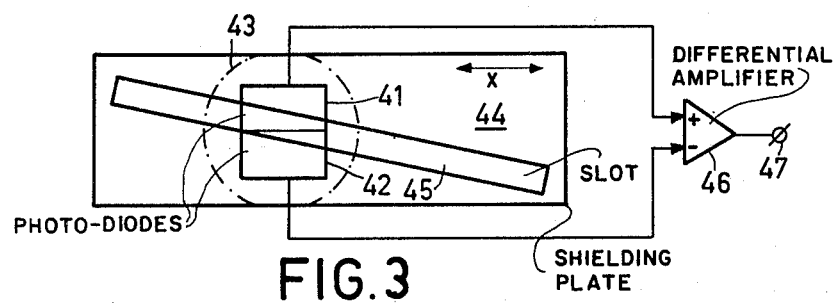
FIG. 3 shows a possible version of the position indicator.

A substantially better result can be obtained by the use of an optical position indicator, because in that case there are no friction and wear at all. Optical position indicators are known in a multitude of versions from the literature. By way of illustration FIG. 3 schematically shows an example of such an optical position indicator. This indicator comprises two adjacently disposed photo-diodes 41 and 42 which are illuminated by a radiation beam 43. These photo-diodes 41 and 42 and the radiation source emitting the radiation beam 43 occupy a fixed position opposite each other, in the Figure in a direction perpendicular to the plane of the drawing. Between this radiation source and the photodiodes a shielding plate 44 is arranged, which is coupled to the positioning member 5 and in the case of a movement of said positioning member moves in the direction x. Said shielding plate 44 has a slot 45 which is disposed obliquely relative to the x direction, via which slot 45 a part of the radiation beam 43 emitted by the radiation source is incident on the photodiodes 41 and 42. Depending on the position of the shielding plate 44 in the x-direction the amount of light received by the two photodiodes varies. The desired position signal can consequently be obtained by applying the output signals of the two photodiodes 41 and 42 to the two inputs of a differential amplifier 46, at whose output terminal 47 the desired position signal is then available. This output terminal 47 consequently corresponds to the terminal 15 in FIG. 1.

Figure 4:
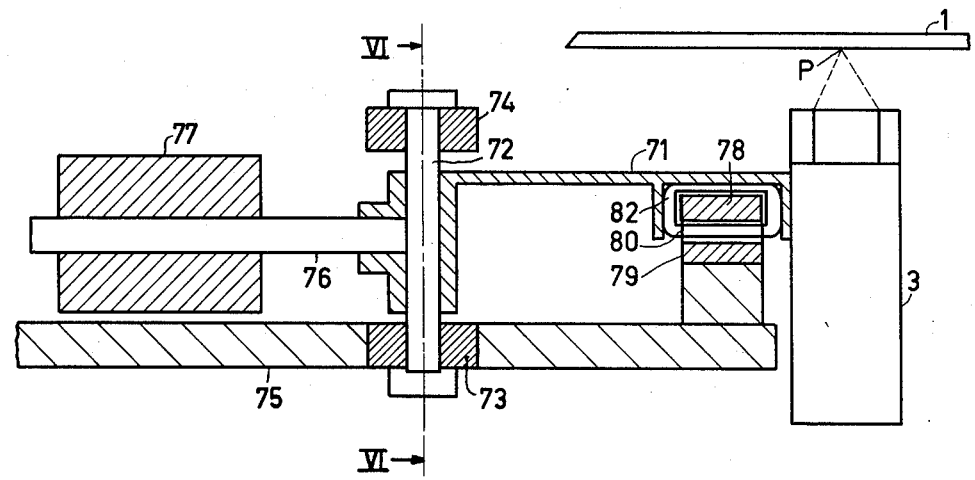
FIGS. 4, 5 and 6 show a preferred version of the positioning member with drive means and position indicator.
Figure 5:
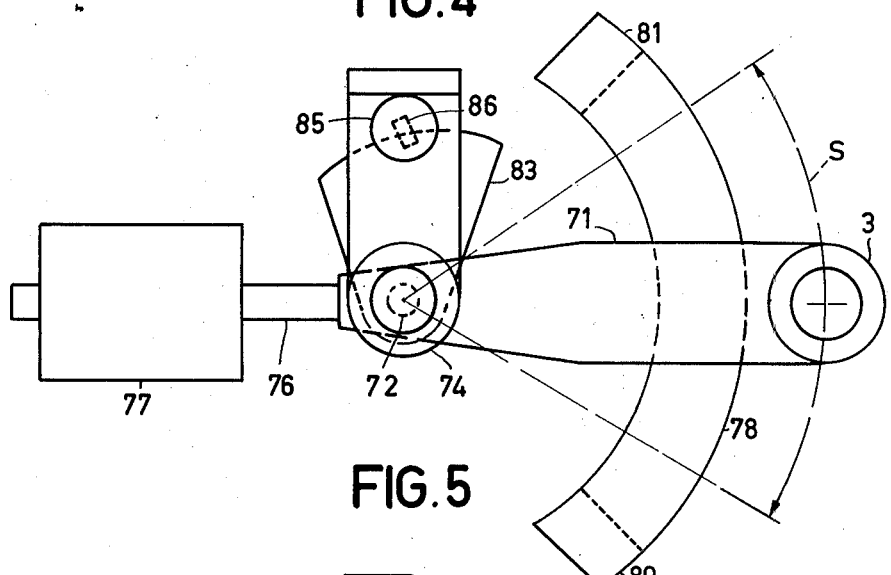
Figure 6:
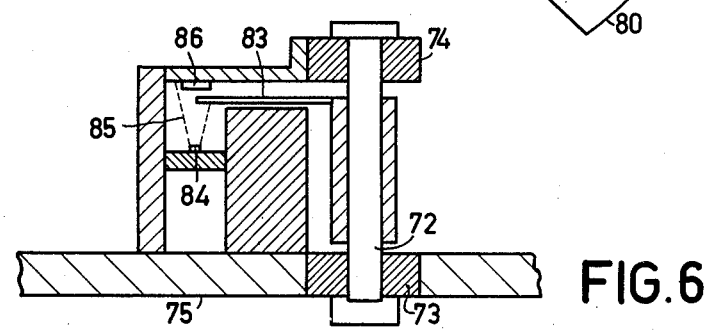

FIGS. 4, 5 and 6 show a preferred version of a positioning member together with drive means and position indicator for use in the apparatus in accordance with the invention and in this order show a side view, a plan view and a cross-sectional view.

The optical read element 3 is mounted on a carrying arm 71. Said read element 4 comprises all elements required for emitting the radiation beam, and for detecting the amount of light reflected by the record carrier 1. Moreover, said read element accommodates means which ensure that the scanning spot P always remains focussed on the surface of the record carrier 1 regardless of vertical movements of said surface. Embodiments of such a read element 3 may inter alia be found in U.S. Pat. No. 4,135,083 and U.S. application No. 735,120, filed Oct. 10, 1976 and now abandoned in favor of application Ser. No. 924,858, filed July 18, 1978.

The carrying arm 71 is secured to a spindle 72 which is rotatably journalled in two bearings 73 and 74, which bearings are connected to a base plate 75. Moreover, an arm 76 is connected to the spindle 72, on which arm a weight 77 is mounted so as to be movable, which weight 77 acts as counterweight for the carrying arm 71 and the read element 3. By a rotation of the carrying arm 71 via the spindle 72 the optical read element 3 can describe a path S. In contradistinction to that in the embodiment of FIG. 1 this is no rectilinear path, but a curved path, the curvature obviously being dependent on the length of the carrying arm 71. The length of this path S and the length of the carrying arm 71 have been selected so that the chord enclosed by said path S corresponds to the required range of the scanning spot P in the radial direction.

The drive means for the positioning member, i.e. for the read element 3 and the carrying arm 71, comprises two curved rectangular iron rods 78 and 79, at whose ends two permanent magnets 80 and 81 are placed between the two rods. Thus, it is achieved that a homogeneous vertical magnetic field is produced in the gap between said iron rods 78 and 79 over the entire length of said rods. The rod 78 is surrounded by a coil 82, which is mounted on the carrying arm 71 and whose lower coil-wire portions are consequently disposed within the magnetic field between the two rods 78 and 79. By energizing this coil 82 said coil and thus the carrying arm 71 are subject to a force in a direction parallel to the longitudinal direction of the two rods 78 and 79, which results in a rotation of the carrying arm 71 and consequently a movement of the read element 3 along the path S. Thus, radial position control of the read element 3 is obtained by controlling the magnitude and polarity of the current through the coil 82, so that the control terminal 12 in FIG. 1 corresponds to the connection points of the coil 82 in the present example.

The position indicator comprises a vane 83 which has a shape as shown in the Figure and which is connected to the spindle 72. This vane has such dimensions and is arranged so that its end is disposed between a light-emitting diode 84 and a photodetector 86.

Depending on the angular position said vane shields the photodiode 86 from the radiation beam 85 to a greater or smaller extent, so that the amount of light measured by this photodiode 86 may be used as position signal for the read element 3. The shape of the end of the vane 83 is selected so that the output signal of this photodiode is not a measure of the angular position of the carrying arm 71, which would mean that the shape of the end of the vane should be such that it corresponds to a sector of a circle, but is a direct measure of the radial position of the read element 3 relative to the drive spindle for the record carrier. Moreover, the shape of the end of the vane may provide a correction for the fact that without the use of a lens system the radiation beam emitted by the light-emitting diode 84 has not a homogeneous light distribution, but rather a Gaussion distribution.

Figure 7:
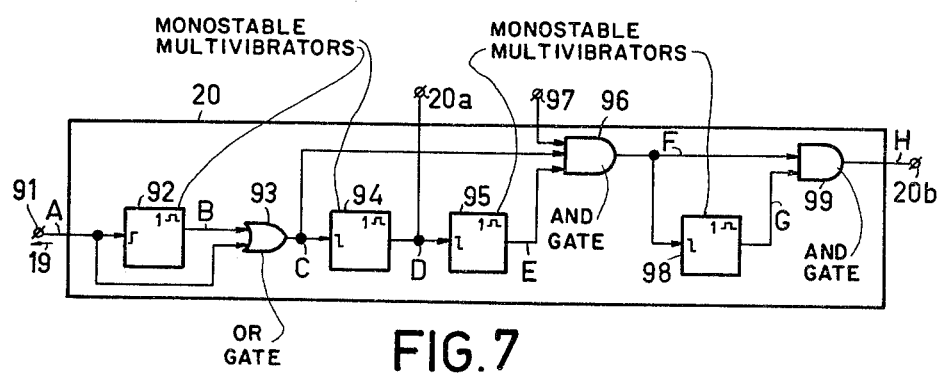
FIG. 7 shows a possible version of the control circuit.
Figure 8:
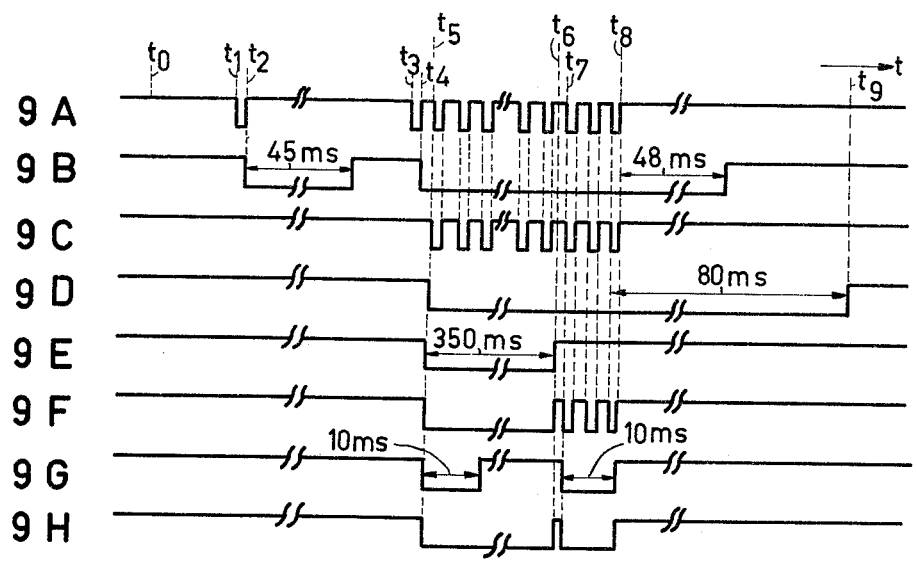
FIG. 8 shows signal waveforms appearing in said circuit.

FIG. 7 shows an example of the circuit 20 of FIG. 1, which circuit with the aid of logic elements defines a criterion which may be used for the change-over between the servo control loop I and servo control loop II and vice versa. In order to explain the operation of this circuit the signal waveforms which may appear on the various points designated by reference letters in the circuit of FIG. 7 are shown in FIG. 8, using the same reference letters.

The circuit 20 of FIG. 7 first of all comprises an input terminal 91, which is connected to the amplitude detector 19 of FIG. 1. This input terminal 91 is connected to the input of a monostable multivibrator 92, which for example, has a relaxation time of 45 msecs. The input and the output of this monostable 92 are connected to an OR-gate 93, whose output is connected to a second monostable 94, which has a relaxation time of for example 80 msecs. The output of said monostable 94 is connected to the output terminal 20a of the circuit 20 and consequently supplies the control signal for the sample-and-hold circuit 17 in FIG. 1 or the switch 31 in FIG. 2. This output of the monostable 94 is moreover connected to a third monostable 95 having a relaxation time of for example 350 msecs. The output of this monostable 95 is connected to an input of an AND-gate 96, having two further inputs which are respectively connected to the output of the OR-gate 93 and a terminal 97. The output of this AND-gate 96 is connected both to an input of AND-gate 99 and to a fourth monostable 98 having a relaxation time of for example 10 msecs, whose output is connected to a second input of the AND-gate 99. The output of said AND-gate is finally connected to the output terminal 20b of the switch 20 and consequently supplies the control signal for the switch 10 in FIGS. 1 and 2.

A first criterion which applies to the circuit of FIG. 7 relates to the distinction between two possible situations which may occur if the information signal on signal terminal 7 of FIG. 1 fails to appear. As previously stated, the information track of the disk-shaped record carrier 1 may exhibit a drop-out, for example as a result of a surface flow in the disk surface. Such a dropout will obviously lead to a brief disappearance of the signal on the signal terminal 7, but need not necessarily result in failure of the radial servo system. Indeed, it is very well possible that the scanning spot after passing the damaged location on the disk still coincides with the desired track. In that case there is obviously no reasson to change over from the servo control loop I to the servo control loop II. However, if such a dropout does lead to a tracking failure, i.e. failure of the radial servo control, for example as a result of the duration of said dropout or if there is a different cause for said tracking failure, it is obvious that this change-over from servo control loop I to servo control loop II should be performed. In order to lay down a suitable criterion for this, the circuit of FIG. 7 makes use of the probability or rather improbability, that more than one dropout occurs on the disk within a specific length of time. To this end a time window of suitable duration is defined upon disappearance of the signal on the signal terminal 7. If no further signal disappearance occurs within said time window, the first-mentioned disappearance of the signal on terminal 7 has been caused by a dropout on the disk with a high degree of certainty and no change-over is necessary. However, if a further disappearance of the signal occurs within this time window it is assumed that this is the result of the failure of the radial servo system and change over is effected. In that case the scanning spot will move radially relative to the record carrier over a number of tracks which inter alia depends on the eccentricity of said record carrier, so that alternately an information signal and no information signal is available on the signal terminal 7. It may then be assumed with a probability which depends on the selected length of the time window that a tracking failure has occurred and that a change over is necessary from servo control loop I to servo control loop II. In the circuit of FIG. 7 the said time window is defined by the monostable 92 and is 45 msecs in a version which has been used.

A second criterion relates to returning from servo control loop II to servo control loop I. This change-over, i.e. the attempt to lock in to an information track via servo control loop I, should not be performed until it has been ascertained that, while maintaining the radial control of the servo control loop II, the scanning spot has resumed its original radial position, which obviously takes some time. In the version of the circuit of FIG. 7 a 350-msec time window is obtained with the aid of the monostable 95, so that returning from servo control loop II to servo control loop I is not possible until 350 msecs, after changing over from servo control loop I to servo control loop II.

In order to clarity the operation of the circuit 20 of FIG. 7 reference is now made to FIG. 8. It is assumed that at the instant $t_0$ the servo control loop I is operative and the scanning spot coincides with a desired information track. Thus, information is being read, so that the output of the amplitude detector 19 supplies a logic "1" level and the signal A is a logic "1". Furthermore, it is assumed that that at said instant $t_0$ the signals B to H all have a logic "1" level. The time axes have been interrupted at various instants so as to enable the various signal waveforms to be shown more clearly.

At the instant $t_1$ a dropout occurs on the disk, so that the signal A briefly becomes a logic "0". Monostable 92 is triggered by the positive-going edge of the signal A at the instant $T_2$, so that the signal B becomes a logic "0" for a duration corresponding to the 45 msec time window. Since the signal A continuously remains a logic "1" within this time window the output signal V of the OR-gate 93 also remains a logic "1", so that the logic levels of the other signals D to H do not change either and the servo control loop I consequently remains operative.

At the instant $t_3$ a tracking failure occurs, i.e. the scanning spot no longer coincides with the information track but occupies at undefined position. Depending on inter alia the eccentricity of the disk there will be a relative radial movement between the disk and the scanning spot over a number of track pitches, so that the scanning spot alternately coincides and does not coincide with an information track. This means that information is read or not in accordance with a specific comparatively high repetition frequency, which means that the signal A exhibits changes between the logic "1" and "0" levels with said repetition frequency. The first positive-going edge of the signal A at the instant $t_4$ triggers the monostable 92, so that signal B becomes a logic "0". Since after the 45-msec. time window defined by said monostable the signal A becomes "0" again at the instant $t_5$, the signal C also becomes "0" at said instant. The negative-going edge of the signal C triggers the monostable 94, so that the signal D assumes a logic "0" value, which signal D activates the memory circuit 17 (FIG. 1) via the terminal 20a. The negative-going edge of the signal D also triggers the monostable 95, so that the signal E also becomes "0". Via the AND-gate 96 the signal F and thus the signal H on the output terminal 20b also becomes "0" at the instant $t_5$, so that at the instant $t_5$ change-over is effected from servo control loop I to servo control loop II.

The monostable 95 has a relaxation time of 350 msecs., so that the signal E and thus the signals F and H remain "0" during this interval causing the servo control loop II to remain operative for at least said interval. After these 350 msecs. the signal E becomes a logic "1" again at the instant $t_6$ and after this instant affirst attempt can be made to lock in to the information track via the servo control loop I. At the instant that the signal C is "1" again ($t_6$ in the present example), which corresponds to an instant at which the scanning spot coincides with an information track, the signal F becomes a logic "1" (terminal 97 is continuously "1" for the adopted mode) and the signal H also becomes a logic "1". Thus, change-over to servo control loop I is effected at this instant $t_6$.

It is assumed that at this instant this servo control loop I is not yet capable of locking in to an information track. This means that the signal A also keeps changing its logic level after this instant $t_6$. The same then applies to the signal C and the signal F. The first negative edge of the signal F after the instant $t_6$, i.e. at the instant $t_7$, triggers the monostable 98, so that the output signal G of this monostable will be a logic "0" for 10 msecs, which automatically means that the signal H also remains "0" for these 10 msecs and servo control loop II remains consequently operative for the time interval $t_7$-$t_8$. After this instant $t_8$ the signal G is "1" again, so that at the next instant at which the signal F becomes "1" again (coinciding with $t_8$ in the present example) the signal H also becomes "1" again and change-over to servo control loop I is effected. If this servo control loop I actually locks in to an information track the signal A remains a logic "1" after this instant $t_8$ and so do the signals C, F, G and H, so that servo control loop I remains operative.

The monostable 94 is of a so-called retriggerable type, i.e. the relaxation time of this multivibrator is related to the last-applied edge of its input signal, even if this edge appears within the relaxation time determined by a preceding edge. This means that the signal D remains a logic "0" for the entire period $t_5$-$t_8$ and for 8 msecs. after this last instant $t_8$ (in fact the last negative edge of the signal C preceding said instant $t_8$). It is not until the instant $t_9$ that the memory function of the memory circuit 17 (FIG. 1) is rendered inoperative as a result of this. This has been done in order to ensure that at the instant that the information about the desired radial position is lost the servo control loop I has definitely locked in to the information track.

The multivibrator 92 is of the same type as said multivibrator 94 in order to ensure that the level of signal B does not change during the interval $t_4$-$t_8$, which would allow change-over to servo-control loop I at a wrong instant. The signal B consequently does not become "1" again until 45 msecs. after the instant $t_8$.

The best way to illustrate the function of the multivibrator 98 is by assuming that the signal F is used as control signal for the switch 10 (FIG. 1). After failure of the first attempt to lock in (instant $t_7$) this would give rise to switching between the servo control loops I and II with the comparatively high repetition frequency of the signal F. This may lead to instability of the entire system. The multivibrator 98 ensures that after failure of an attempt to lock in (instant $t_7$) the servo control loop II remains operative for 10 msecs., and a subsequent attempt to lock in is not effected until after these 10 msecs. Within these 10 msecs. the system is sufficiently stabilized in respect of the desired radial position via the servo control loop II, so that by the use of the multivibrator 98 the occurrence of such an instability is prevented.

As previously stated the terminal 97 continuously receives a logic "1" during the "normal" playing mode described, for which purpose said terminal 97 is coupled to a control for selecting the playing mode. If a specific programme on the disk is to be located a logic "0" is applied to the terminal 97 via the control, which automatically results in change-over to servo control loop II. By moreover switching over the switch 32 in the example of FIG. 2 a desired radial position can then be obtained via potentiometer 34.

From the foregoing it will be evident that the criteria built into the circuit 20 are marginal. On the one hand these criteria depend on the properties of the record carrier which is used, and on the other hand said criteria may be changed depending on the requirements in respect of the behaviour of the control circuits and depending on the technology of the circuits used. If for example the use of a programmable processor is considered (for example a microprocessor), it will be evident that there is a wide range of possibilities in respect of the choice of the criteria and the decision logic. Therefore, the present invention is by no means limited to the use of the circuit 20 as shown in FIG. 7.

What is claimed is:

1. An improved apparatus for reading a disk-shaped record carrier, on which information is recorded in accordance with a pattern of substantially concentric tracks, which apparatus comprises a read element which cooperates with the record carrier, a positioning member carrying said read element for moving said read element in a radial direction, and a first servo control loop operating in response to indicia on the record carrier for controlling the position of the position member, which first servo control loop is provided with a measuring system for measuring the radial positional deviation of the scanning point on the record carrier relative to a desired track, which point is determined by the read element and a drive means for the positioning member, said drive means being coupled to said measuring system, the improvement being characterized in that the apparatus is provided with a control circuit means for detecting a failure of said first servo control loop and for generating a first control signal in response to a detected failure in the radial control servo loop, and switching means coupled to said control circuit means, for rendering the first servo control loop inoperative and for at least substantially simultaneously rendering a second servo control loop operative upon the occurrence of the first control signal, said second servo control loop being provided with a position indicator for supplying a position signal which is representative of the radial position of the read element and is independent of said record carrier indicia, a memory circuit means, which is coupled to said position indicator and to the control circuit, for storing and preserving the value of the position signal at the instant of the occurrence of the first control signal, a differential amplifier for determining the difference between said stored value and the instantaneous value of the position signal, and application means for the application of the difference signal to the drive means of the positioning member.

2. An apparatus as claimed in claim 1, characterized in that the control circuit is adapted to generate a second control signal, after the generation of the first control signal, as soon as a criterion imposed by said control circuit is met, and that the switching means are adapted to render the first servo control loop operative again and the second servo control loop inoperative upon the appearance of the second control signal.

3. An apparatus as claimed in claim 1 or 2, characterized in that the control circuit is coupled to an amplitude detector, which in its turn is coupled to the read element for detecting the amplitude of the information signal appearing on said read detector.

4. An apparatus as claimed in claim 1, characterized in that the memory circuit comprises a sample-and-hold circuit having a signal input, which is coupled to the position indicator, and a control input, which is coupled to the control circuit.

5. An apparatus as claimed in claim 1, characterized in that said memory circuit is provided with a capacitive element and a switch which is included in the connection between said capacitive element and the position indicator, which switch receives a control signal from the control circuit, so as to interrupt said connection upon the occurrence of the first detection signal.

6. An apparatus as claimed in claim 5, characterized in that a second switch is included between the first switch and the capacitive element, which second switch establishes a connection between the capacitive element and either the first switch or a control terminal, which control terminal is adapted to receive a positioning signal for defining a radial position of the read element.

* * * * *